(12) United States Patent
Redford et al.

(10) Patent No.: US 12,019,228 B2
(45) Date of Patent: Jun. 25, 2024

(54) CYLINDRICAL LATTICE LIGHTSHEET—SIMPLIFIED LATTICE ILLUMINATOR FOR LIGHTSHEET MICROSCOPE

(71) Applicant: INTELLIGENT IMAGING INNOVATIONS, INC., Denver, CO (US)

(72) Inventors: Glen Redford, Denver, CO (US); Hugh Masterson, Denver, CO (US)

(73) Assignee: INTELLIGENT IMAGING INNOVATIONS, INC., Denver, CO (US)

( * ) Notice: Subject to any disclaimer, the term of this patent is extended or adjusted under 35 U.S.C. 154(b) by 207 days.

(21) Appl. No.: 17/148,051

(22) Filed: Jan. 13, 2021

(65) Prior Publication Data

US 2021/0215921 A1 Jul. 15, 2021

Related U.S. Application Data

(60) Provisional application No. 62/961,058, filed on Jan. 14, 2020.

(51) Int. Cl.
*G02B 21/08* (2006.01)
*G02B 5/00* (2006.01)
*G02B 27/09* (2006.01)

(52) U.S. Cl.
CPC ............. *G02B 21/08* (2013.01); *G02B 5/001* (2013.01); *G02B 27/0966* (2013.01)

(58) Field of Classification Search
CPC ................ G02B 21/08–14; G02B 27/0966
See application file for complete search history.

(56) References Cited

U.S. PATENT DOCUMENTS

| 7,161,656 B2 * | 1/2007 | Neil ................. G02B 27/0075 |
| | | 355/71 |
| 7,894,136 B2 | 2/2011 | Betzig |
| 9,500,849 B2 | 11/2016 | Lippert et al. |
| 10,018,819 B2 * | 7/2018 | Iguchi ................ G02B 21/16 |
| 10,051,240 B2 * | 8/2018 | Betzig ................ G02B 21/06 |
| 10,247,672 B2 * | 4/2019 | Betzig ............... G01N 21/6458 |
| 10,310,246 B2 * | 6/2019 | Itoh ..................... G02B 21/16 |
| 10,649,196 B2 * | 5/2020 | Osawa ................ G02B 27/58 |

(Continued)

FOREIGN PATENT DOCUMENTS

| CN | 111103678 A | * | 5/2020 | ......... G01N 21/6458 |
| CN | 111157500 A | * | 5/2020 | |

OTHER PUBLICATIONS

Chang, Bo-Jui, et al. "Universal Light-Sheet Generation with Field Synthesis" Nat Methods; 16(3): 235-238; Mar. 2019.
Chang, Bo-Jul, et al. "Two-Beam Interference Lattice Lightsheet for Structured Illumination Microscopy" Journal of Physics D: Applied Physics; 53 044005; Nov. 18, 2019.

(Continued)

*Primary Examiner* — Christopher Stanford
(74) *Attorney, Agent, or Firm* — Jason H. Vick; Sheridan Ross, PC

(57) ABSTRACT

The present disclosure describes a simple, efficient way to generate a lattice lightsheet for a lightsheet microscope. There are no moving parts, and even the need to dither is removed. The light efficiency is many times higher than conventional techniques. Similar to using a cylindrical lens to generate a Gaussian sheet, the present disclosure also uses cylindrical lenses and is called a Cylindrical Lattice Lightsheet or CLLS.

43 Claims, 9 Drawing Sheets

(56) References Cited

U.S. PATENT DOCUMENTS

| | | | |
|---|---|---|---|
| 10,795,144 B2* | 10/2020 | Betzig | G02B 21/06 |
| 10,942,346 B2* | 3/2021 | Loy | G02B 21/082 |
| 11,002,601 B2* | 5/2021 | Fujita | G01J 3/04 |
| 2005/0207003 A1 | 9/2005 | Kobayashi | |
| 2008/0204766 A1* | 8/2008 | Uhl | G02B 21/365 |
| | | | 356/615 |
| 2010/0014156 A1 | 1/2010 | Iketaki | |
| 2011/0304723 A1 | 12/2011 | Betzig | |
| 2016/0195705 A1 | 7/2016 | Betzig et al. | |
| 2018/0011303 A1 | 1/2018 | Loy et al. | |
| 2019/0346776 A1 | 11/2019 | O'Dwyer et al. | |
| 2020/0150446 A1* | 5/2020 | Thibon | G02B 27/46 |

OTHER PUBLICATIONS

International Search Report for International Application No. PCT/US2021/013233, dated Apr. 6, 2021.
Written Opinion for International Application No. PCT/US2021/013233, dated Apr. 6, 2021.
International Preliminary Report on Patentability for International Application No. PCT/US2021/013233, dated Jul. 28, 2022.
Chatterjee, Krishnendu et al. "Recent Progress in Light Sheet Microscopy for Biological Applications" Applied Spectroscopy; vol. 72(8); 113-1169; 2018.
Ellefsen, Kyle et al. "Dynamic $Ca^{2+}$ Imaging with a Simplified Lattice Light-Sheet Microscope: A Sideways View of Subcellular $Ca^{2+}$ Puffs" Science Direct; Cell Calcium 71; 34-44; 2018.
European Search Report for European Patent Application No. 21741924.1, dated Nov. 28, 2023.

* cited by examiner

CYLINDRICAL LATTICE LIGHTSHEET—SIMPLIFIED LATTICE ILLUMINATOR FOR LIGHTSHEET MICROSCOPE

RELATED APPLICATION DATA

This application claims the benefit of and priority under 35 U.S.C. § 119(e) to U.S. Patent Application No. 62/961,058, filed Jan. 14, 2020, entitled "System for a Lightsheet Microscope Lattice Illuminator Using a Cylindrical Lattice Lightsheet," which is incorporated herein by reference in its entirety.

BACKGROUND

The present disclosure is generally directed to lightsheets in optical microscopes and, more specifically, to illumination devices for optical microscopes.

It has been shown that an optical lattice used for lightsheet microscopy gives better resolution, optical sectioning, and light dosage performance than other lightsheet techniques. This combined with the natural large reduction in light dosage native to lightsheets has led to commercial instruments that have been able to capture images that were previously unable to be imaged. Certainly in the domain of single cell imaging, these instruments can be considered to be the best current microscopes.

Unfortunately, the current means for generating optical lattices are expensive and have very low light efficiency (typically <10% of the input light can be used at the sample). These means usually are complicated, contain many moving and electronic parts, and are difficult to align and maintain. Currently there are researchers that are trying to generate optical lattices with femtosecond pulsed IR lasers to achieve a multi-photon effect. These efforts are made extremely difficult due to the low efficiency.

SUMMARY

The present disclosure generally relates to lightsheets in optical microscopes. More specifically, an exemplary embodiment of the present disclosure relates to a simplified illumination device for optical microscopes. Even more specifically, an exemplary embodiment of the present disclosure relates to an optical system for generating an optical lattice as illumination for an optical microscope.

A lattice can be generated piecewise by breaking down the optical lattice into constituent parts at the pupil plane. The three parts of the optical lattice in the pupil plane can be generated separately and integrated in time to give the same result as a lattice generated by a Spatial Light Modulator (SLM) at the image plane. Additionally, since a lattice is most often used dithered (or smeared in on axis), and since a dithered lattice has no information in the axis of dither, there is no need for interference between the beams in that direction. Accordingly, the extension is that a beam that has the same structure at the pupil plane as one constructed by an SLM in the image plane will give the same results. Therefore one must only generate the pupil plane pattern and one gets the optical lattice at the image plane. To get the same effect as a dithered lattice one can additionally remove the interference between the beams at the pupil plane in the dither direction.

If one considers the anatomy of the lattice beam at the pupil plane, one finds that a lattice beam can be generated by three parallel lines clipped by an annulus. This forms a total of four light beams. The two side beams create an envelope that reduces the sidelobes of the lattice. If the light beams interfere with each other, they form a regular structure along the dither axis. The two center beams interfere with each other to generate a single dimensional Bessel which provides the sharp peak in the center of the lattice. All of the beams together generate the complete lattice.

The angular content of the beams at the pupil plane are of particular importance to generating a lattice. A large angular content in the dither axis generates a long lattice which is used to form a wide sheet. In the other axis (i.e., the axial direction in the imaging path), perpendicular to the dither axis (normal to the sheet), there must be no angular content (the beam is collimated) so that one only gets one central lobe in the sheet. Therefore the simplest implementation of a lattice would be to place three cylindrical lenses in a collimated laser beam and focus these lines onto the pupil plane. An annulus is placed at the pupil plane to aperture the three lines and generate a lattice. This setup is very simple and generates a complete lattice. The width of the lattice is dependent on the focal length of the cylindrical lenses. This method of generating a lattice is called Cylindrical Lattice Lightsheet (CLLS).

CLLS is much simpler to make than other methods, but the implementation above has poor throughput since most of the light is blocked by the annulus. CLLS can be further improved by adding a pair of axicon lenses to move the light from the input beam of CLLS to the ring of the annulus. This improves the light throughput by many factors and the total efficiency of the system can be >90%, which is much better than previous methods.

The lattice generated by this means is the same as previous methods, but what is actually desired is a dithered lattice which removes the content of the lattice in the dither axis. A typical lattice will do this by using a scanner to smear the lattice in that direction. CLLS can use a scanner in this method, but better techniques may be used.

To generate a dithered lattice, one must remove the interference between the three constituent beams. One could time modulate the beams and integrate, but this would lead to complexity and loss of efficiency. One can remove the interference from one of the three beams by adding a waveplate to one of the beams. There are now only two beams interfering and we get partial dither. The third beam can be altered with a time-varying waveplate using a liquid crystal (LC) device or by moving shear waveplates. These devices are inexpensive and have good throughput. The resulting beam is now identical to a standard dithered lattice without the need for a scanner. The beam can be used as a lightsheet directly.

Considering further the effect of the beam at the back aperture on a scanned beam, the lateral position of any part of the beam has little effect on the resultant sheet. Therefore there is no need for the two side beams to be on the outside of an annulus, but they can be anywhere horizontally. One can then combine the two side beams and move them to the middle of the back aperture. One must still break the symmetry between this now middle beam and the top and bottom beams, so a waveplate is added to either the middle beam or the top and bottom beams. This means that the complete scanned lattice sheet can be created with only a single cylindrical lens.

The much higher efficiency and simpler design of CLLS leads to easier implementation of multi-photon lattice systems, and lattice microscopes in general. The reduction in cost alone is at least 2× for the complete system, coming from the expensive SLM, galvos and high power lasers.

The exemplary apparatus can comprise: An optical device for generating three parallel lines that are focused in the dither axis and collimated in the other axis.

This device could exemplarily be a set of three cylindrical lenses or a single cylindrical lens in the case of combined side beams.

A mask for blocking unwanted light from the three lines.

This exemplary apparatus could additionally comprise:

Means for increasing the light through the annulus such as a pair of axicons before the cylindrical lenses.

Means for removing the interference between the three generated lines.

This means could be a fixed waveplate on one line and a time-varying waveplate on another line.

This apparatus when combined would constitute a simplified optical lattice illumination system for a lightsheet.

This device has the advantage of much less cost, easier alignment and maintenance, and much higher light efficiency.

Aspects of the disclosure are thus directed towards lightsheets in optical microscopes.

Still further aspects of the disclosure are directed toward a simplified illumination device for optical microscopes.

Even further aspects of the disclosure are directed toward an optical system for generating an optical lattice in a lightsheet microscope.

These and other features and advantages of this disclosure are described and, or are apparent from, the following detailed description of the exemplary embodiment.

BRIEF DESCRIPTION OF THE DRAWINGS

The exemplary embodiments of the present disclosure will be described in detail, with reference to the following figures wherein.

DETAILED DESCRIPTION OF THE DRAWINGS

The exemplary embodiments of the present disclosure will be described in relation to microscopes, imaging systems, and associated components. However, it should be appreciated that, in general, known components will not be described in detail. For purposes of explanation, numerous details are set forth in order to provide a thorough understanding of the present disclosure. It should be appreciated however that the present disclosure may be practiced in a variety of ways beyond the specific details set forth herein.

Figure 1:
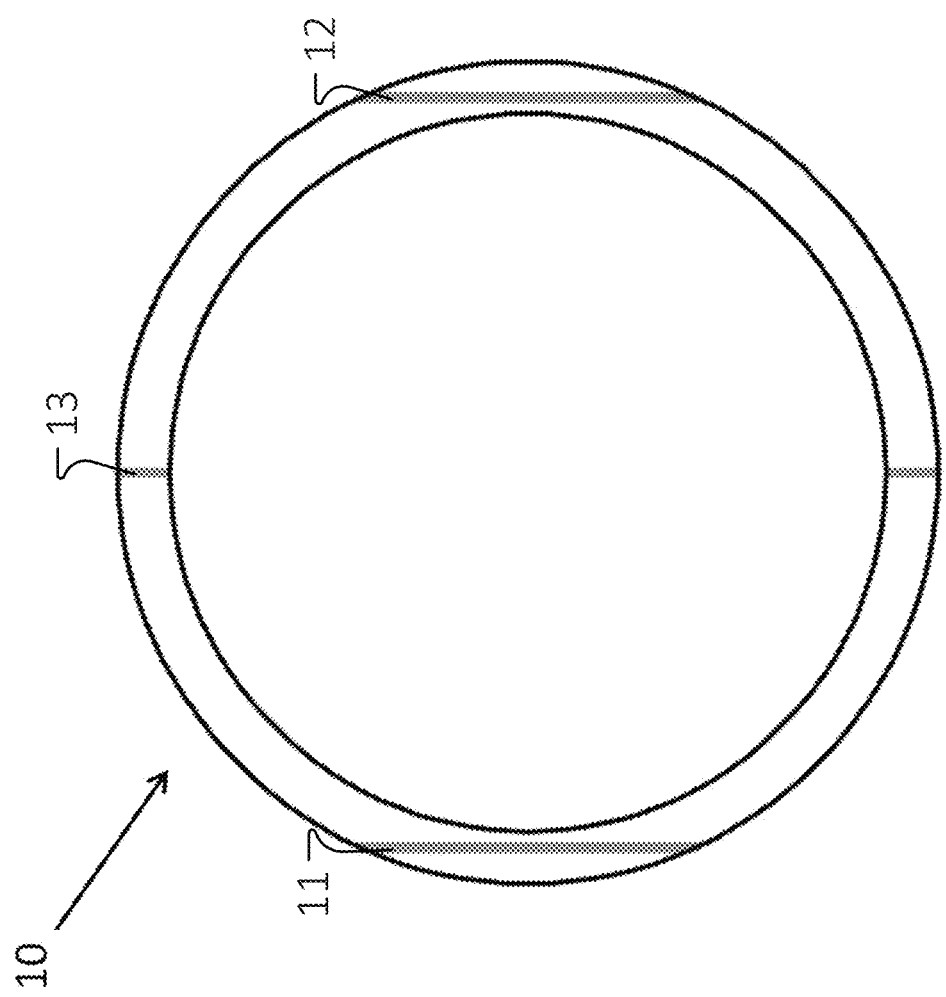
FIG. 1 illustrates the pattern of illumination at the pupil plane to generate a lattice.

FIG. 1 illustrates the pattern of illumination required to generate an optical lattice as seen at a pupil plane 10. The pattern comprises three lines 11, 12, and 13. The three lines 11, 12, and 13 may indicate locations on an annulus through which light passes. In some embodiments, the three lines may be vertical (e.g., spanning from one side of the annulus to the other) and/or parallel. As viewed in FIG. 1, the lines 11 and 12 are located at the two edges of the annulus, while the line 13 is located in the middle (e.g., down the center) of the annulus. In some embodiments, the line 13 may separate the annulus evenly into two similar or identical sections. By forming such a pattern at the pupil plane 10 (e.g., the placement of the lines 11, 12, and 13), an optical lattice is generated at the image plane. The lines 11, 12, and 13 may be spaced such that different optical lattices are generated on the image plane. For example, the lines 11, 12, and 13 may be spaced to generate a square lattice or a hex lattice. In some embodiments, the pattern may comprise additional and/or alternative lines (e.g., three parallel lines, four parallel lines, etc.). The positioning of the three lines 11, 12, and 13 may generate an un-dithered lattice. As previously mentioned, the three parts of the optical lattice (e.g., the light represented by the three lines 11, 12, and 13) may be integrated in time to provide an un-dithered lattice, rather than utilizing an SLM at the image plane.

Figure 2:
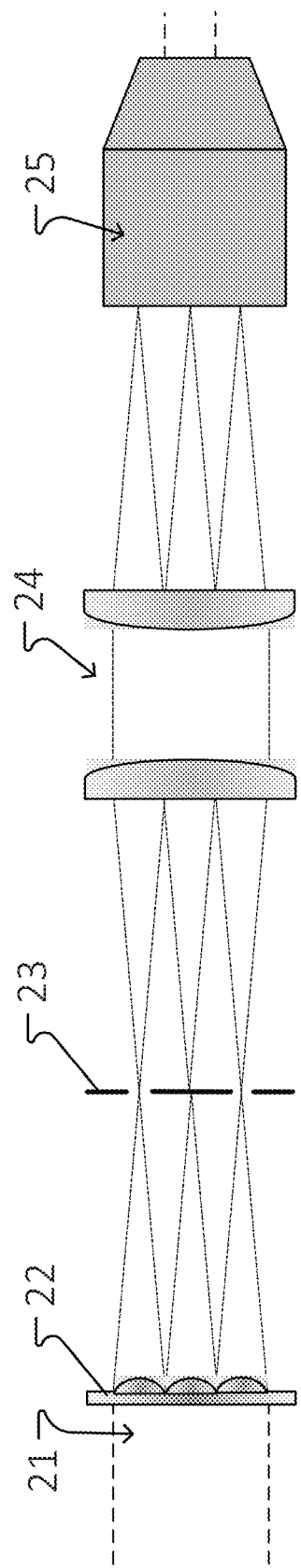
FIG. 2 illustrates an exemplary embodiment of the present disclosure with the minimal optical components needed to generate a lattice lightsheet.

FIG. 2 illustrates an exemplary embodiment of the present disclosure which shows the minimum optics required to generate a lattice lightsheet. An input laser beam 21 is sent through an array of cylindrical lenses 22. As the laser beam 21 passes through the cylindrical lenses 22, the cylindrical lenses 22 may bend, curve, or otherwise focus the light into an annulus mask 23. In some embodiments, the cylindrical lenses may focus the light into the annulus mask 23 such that the lines 11, 12, and 13 form on the annulus mask 23. In other words, the image of the light from the annulus mask 23 may have the form of the pupil plane shown in FIG. 1. In some embodiments, multiple cylindrical lenses (e.g., two, three, four, etc.) may be used. The image is relayed using an optical relay 24 to the pupil plane of an objective 25. The optical relay 24 may be a series of mirrors or other optical elements (e.g., axicons) configured to take the shape of the light focused into the annulus mask 23 and replicate or pass the shape to the pupil plane of the objective 25.

In some embodiments, the minimum optics may further comprise multiple annuli (e.g., a plurality of annuli) placed at the pupil plane (not shown). The multiple annuli may include additional or alternative thicknesses and/or diameters, which may allow the system to be changed, altered, or otherwise reconfigured to generate different lattice shapes and sizes depending on, for example, a specific experiment or other application. In some embodiments, similar or the same effect of changing the thickness and/or diameter of the annulus using a variable magnification relay or an SLM.

Figure 3:
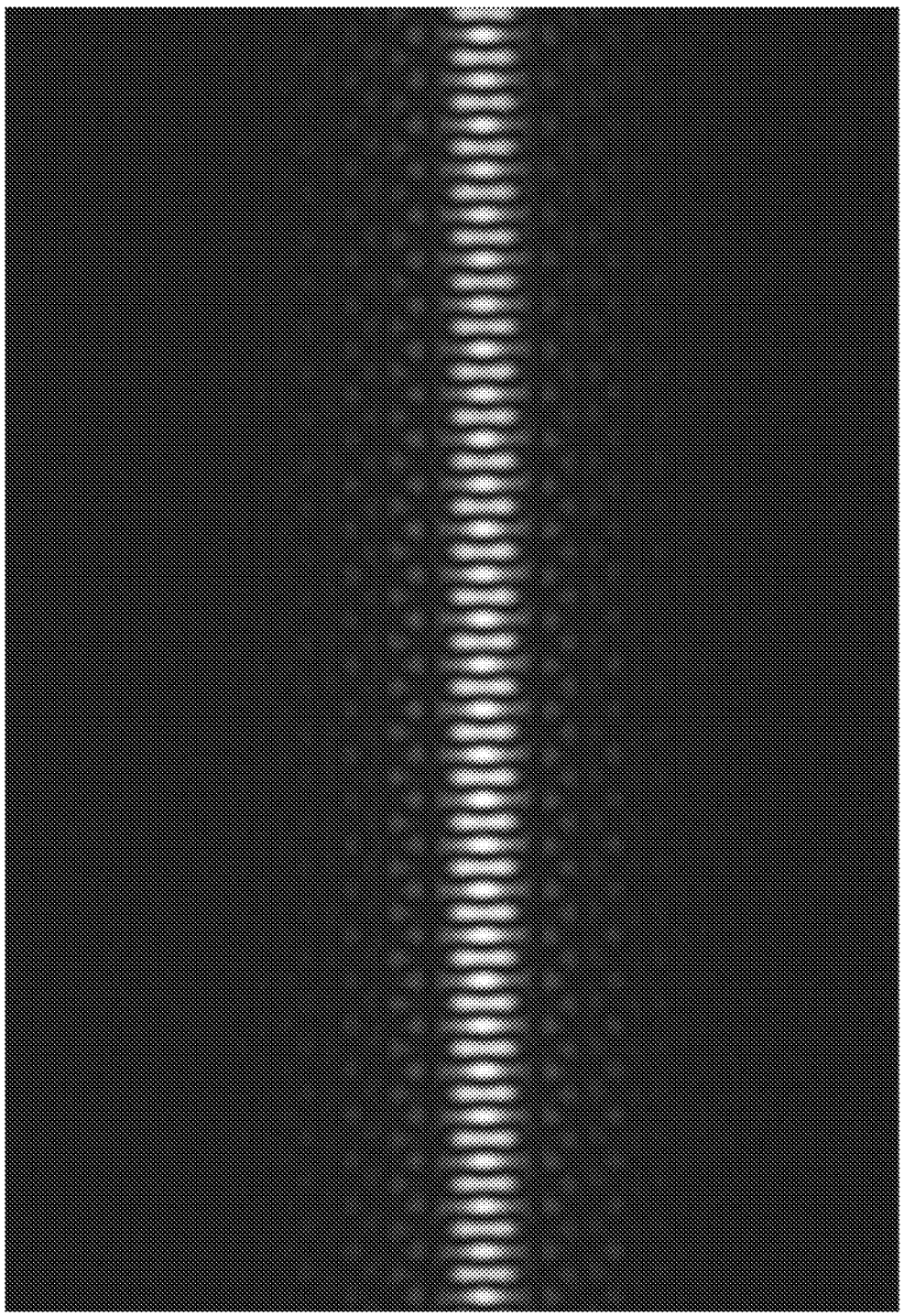
FIG. 3 is an image of data generated by an exemplary embodiment of the present disclosure.

FIG. 3 shows an image of the optical lattice as generated by the setup of FIG. 2. The lattice depicted in FIG. 3 is identical to those generated by other methods and closely matches the theory.

Figure 4:
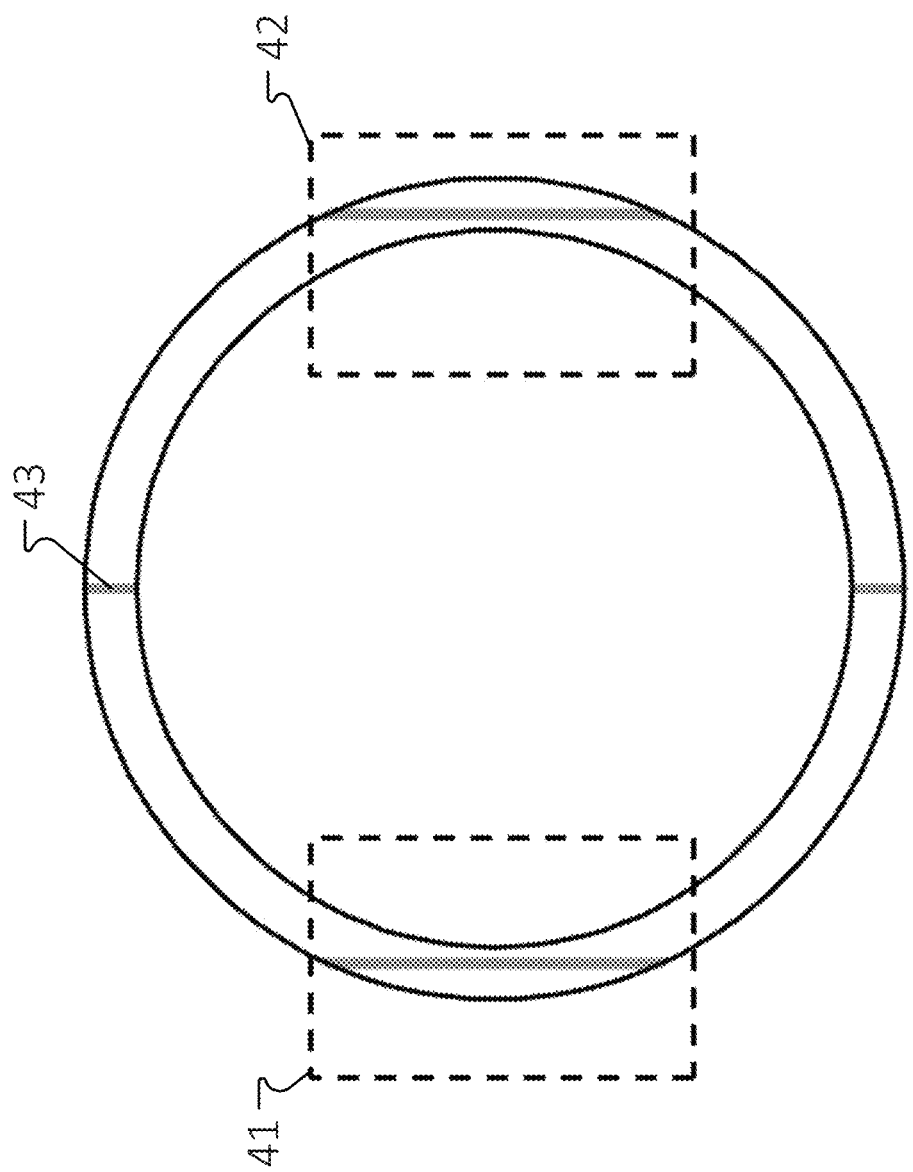
FIG. 4 illustrates where additional optics can be added to modify the beam in an exemplary embodiment of the present disclosure.

FIG. 4 illustrates the pattern of illumination as in FIG. 1 and the modifications used to generate a smeared sheet. A smeared sheet may be a lattice sheet with a less clear lattice structure. To break the fine lattice structure seen in FIG. 3 in the horizontal direction, the coherence between the three lines may be disrupted. A waveplate 41 is added to a beam (e.g., the beam represented by the line 11), which removes the coherence of the beam with the other two beams on the pupil plane. A variable waveplate or moving shear plates 42 is added to another beam (e.g., the beam represented by line 12) to remove the coherence with the center beam 43, which is left unchanged. In some embodiments, the smearing of the sheet may create a similar or the same lattice as a dithered SLM at an image plane. For instance, the three beams (e.g., lines 11, 12, and 13) may be integrated in time to create a sheet identical to a dithered SLM lattice.

Figure 5:
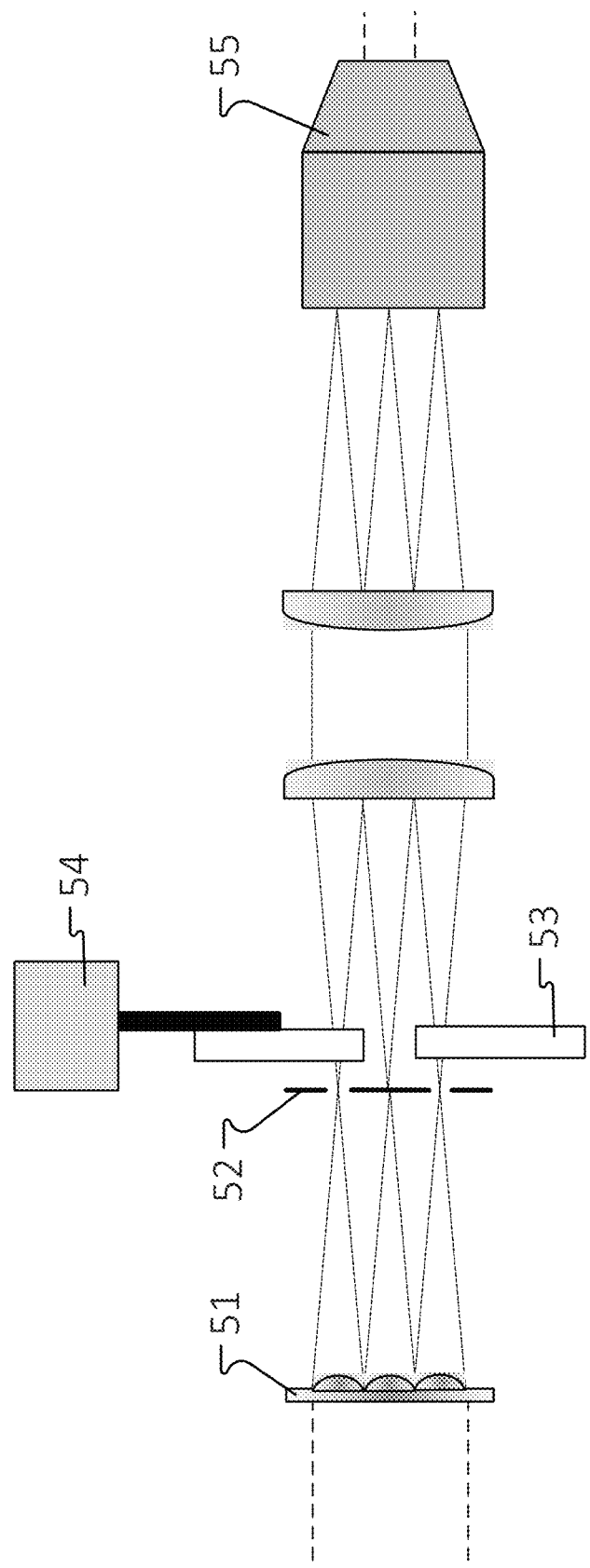
FIG. 5 illustrates an exemplary embodiment of the present disclosure showing additional optics to smear the lightsheet.

FIG. 5 illustrates an exemplary embodiment of the present disclosure as in FIG. 2, with additional optics to generate a smeared sheet. The beam is split into three lines using the cylindrical lenses 51. After the annulus mask, 52, separate optics are added to the now separate beam paths. A waveplate 53 is added to one path (which may be similar to the waveplate 41). A variable waveplate 54 is added to another path. The variable waveplate 54 may be an adjustable device to adjust the coherence of the light passing therethrough with the other lines passing through the annulus. The use of the waveplate 53 and/or the variable waveplate 54 gives a smeared lightsheet out of the objective 55.

Figure 6:
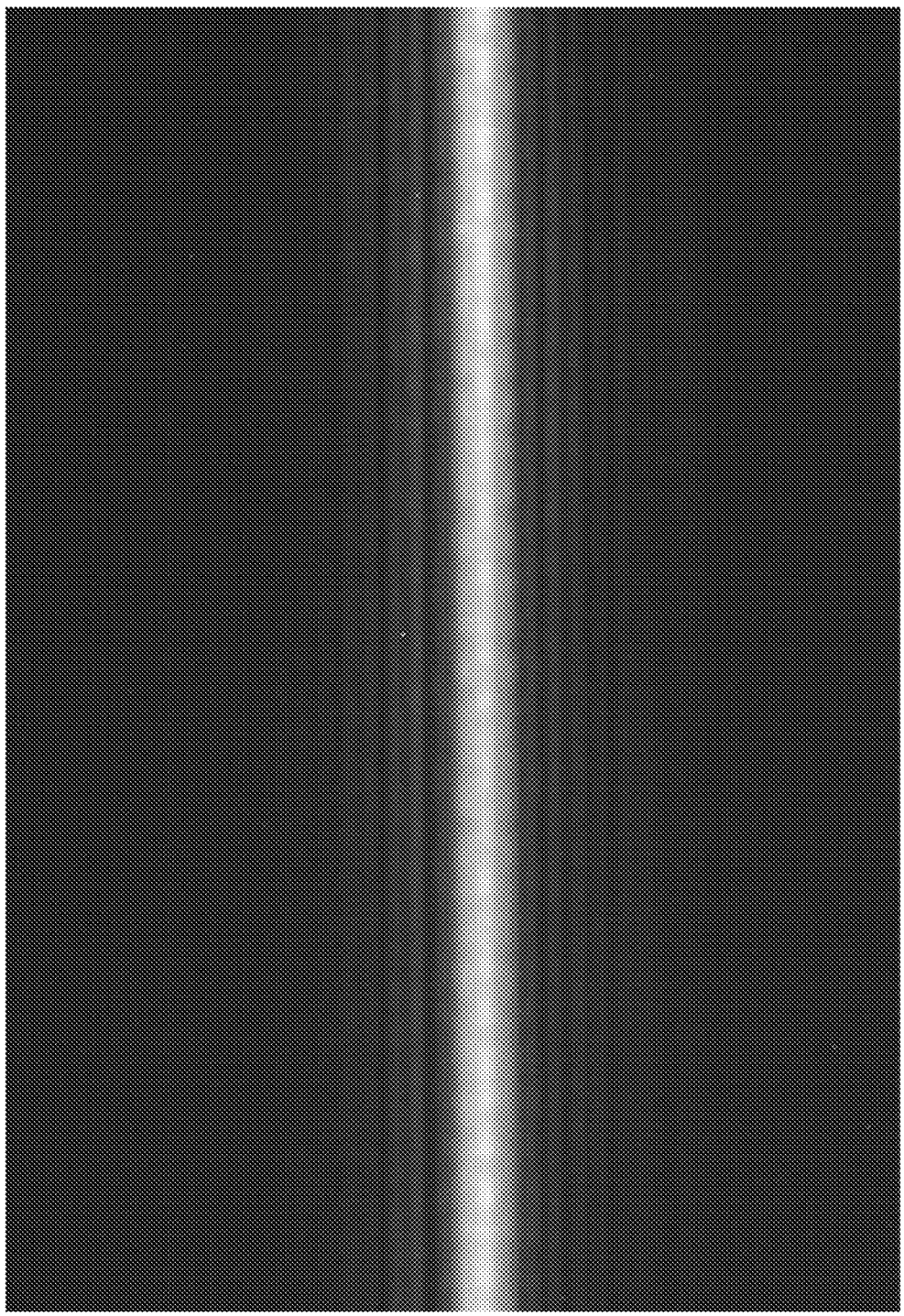
FIG. 6 is an image of the data generated by an exemplary embodiment of the present disclosure.

FIG. 6 shows an image of the smeared optical lattice as generated by the setup of FIG. 5. The broken coherence changes the lattice from FIG. 3 to be a smeared lightsheet.

Figure 7:
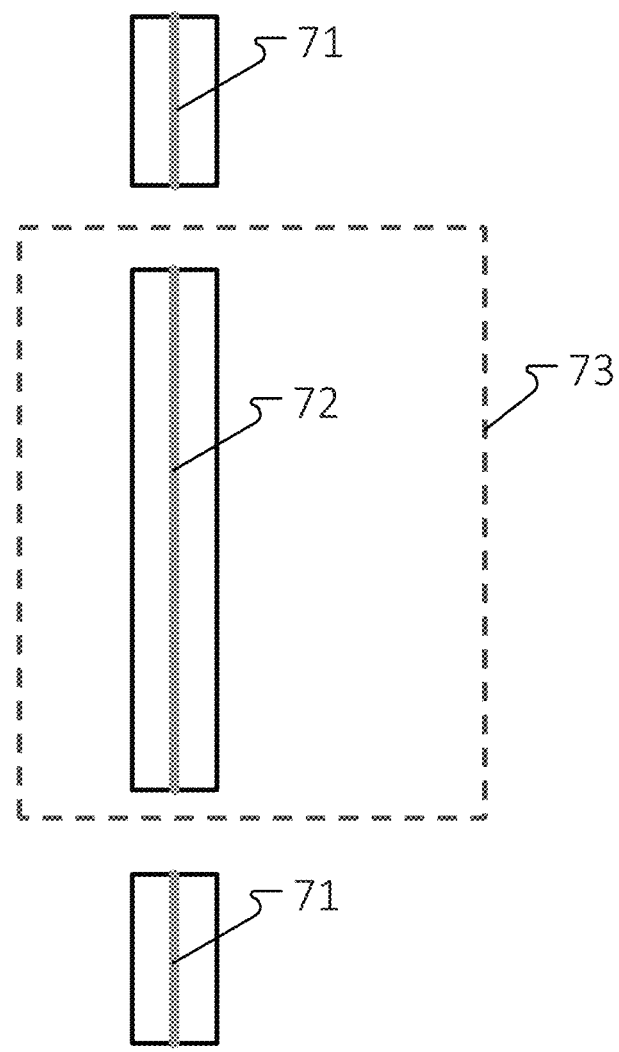
FIG. 7 illustrates the pattern of illumination where the side beams are combined to the middle of the pupil plane.

FIG. 7 illustrates the pattern of illumination as in FIG. 1 and the modifications needed to generate a smeared sheet with combined side beams. The top and bottom beams 71 may remain unchanged from the embodiment shown in FIG. 1 (e.g., the top and bottom beams 71 may be similar to line 13 from FIG. 1). The two side beams 11 and 12, however, are combined into a single beam 72. To break the fine structure seen in FIG. 3 in the horizontal direction, a waveplate 73 is added to the single beam 72, which removes the coherence of the single beam 72 with the other two beams 71.

Figure 8:
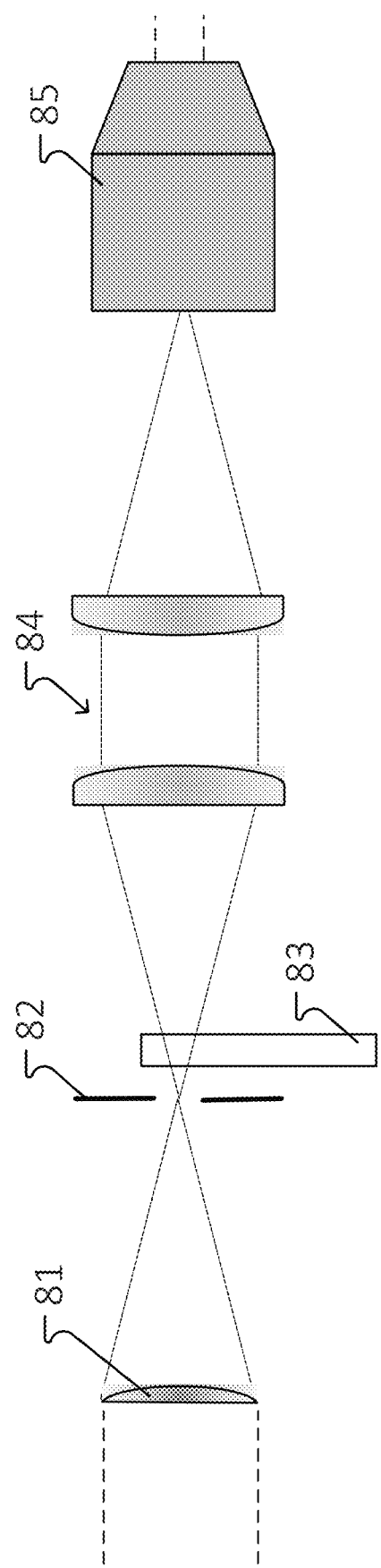
FIG. 8 illustrates an exemplary embodiment of the present disclosure with combined side beams to generate a lattice lightsheet.

FIG. 8 illustrates an exemplary embodiment of the present disclosure as in FIG. 7, with optics combining the side beams. The beam is sent through the cylindrical lenses 81. After passing through the mask 82, three separate beams are created. A waveplate 83 is added to the middle beam. A relay 84 images the mask onto the pupil plane. This gives a smeared lightsheet out of the objective 85.

Figure 9:
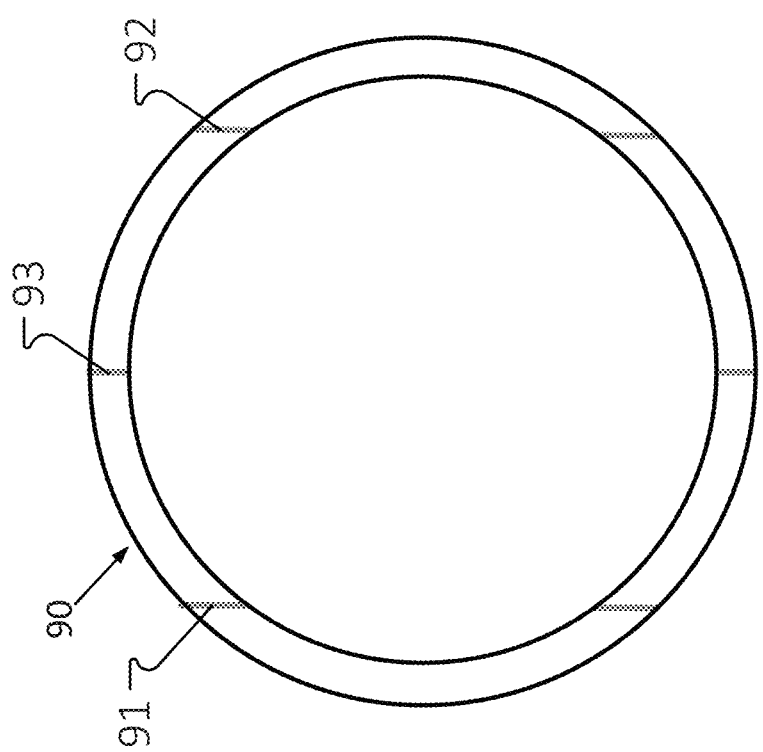
FIG. 9 illustrates the pattern of illumination at the pupil plane to generate a hex lattice.

FIG. 9 illustrates the pattern of illumination to generate a "hex" lattice at the pupil plane 90 of the excitation objective. The lattice shown in FIG. 9 is similar to FIG. 1, but with the spacing of the three beams changed. In particular, the three beams are spaced closer together. This spacing of the three beams (91, 92 and 93) causes the resulting lattice to change to a hexagonal pattern used in, for example, SIM applications.

The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

The exemplary techniques illustrated herein are not limited to the specifically illustrated embodiments but can also be utilized with the other exemplary embodiments and each described feature is individually and separately claimable.

Aspects of the technology are directed toward an illumination system for a lightsheet microscope for generating a lattice that comprises: means to generate two or more parallel lines focused on the pupil plane; and means to confine light from the two or more parallel lines to the clear aperture of an annulus.

Any of the above aspects, wherein the means for generating the two or more parallel lines is an array of more than one cylindrical lenses.

Any of the above aspects, wherein the two or more parallel lines comprises three parallel lines.

Any of the above aspects, wherein the three parallel lines are spaced on the annulus to generate a square lattice or a hex lattice.

Any of the above aspects, further comprising a variable optical relay configured to change a spacing of the two or more parallel lines.

Any of the above aspects, wherein the means for confining the light is an annulus mask.

Any of the above aspects, further comprising a pair of axicons configured to further confine the light to the annulus.

Any of the above aspects, further comprising a phase-plate configured to shape the light into an annulus ring.

Any of the above aspects, wherein the means to confine the light to an annulus is configured to change the annulus thickness and diameter.

Any of the above aspects, wherein a plurality of annuli can be moved into place at the pupil plane, and wherein the plurality of annuli have different thicknesses and diameters.

Any of the above aspects, wherein a variable optical relay is used to change the diameter of the annulus.

Any of the above aspects, further comprising means to remove coherent interference of the two or more parallel lines.

Any of the above aspects, wherein the means to remove the coherent interference comprises a waveplate in the path of one or more of the two or more parallel lines.

Any of the above aspects, wherein the means to remove the coherent interference comprises a variable waveplate in the path of one or more of the two or more parallel lines.

Any of the above aspects, wherein the variable waveplate is a liquid crystal waveplate.

Any of the above aspects, wherein the variable waveplate is a moving shear plate with varying thickness.

Any of the above aspects, wherein the variable waveplate is a set of moving shear plates.

Aspects of the technology are directed toward an illumination system for a lightsheet microscope for generating a lattice comprising: means to generate one or more parallel lines focused on the pupil plane; and means to modify light from the one or more parallel lines to create at least three beams.

Any of the above aspects, wherein the means for generating the one or more parallel lines is one or more cylindrical lenses.

Any of the above aspects, wherein the one or more parallel lines comprises one line.

Any of the above aspects, wherein the one line is divided by a mask to generate a square lattice or a hex lattice.

Any of the above aspects, wherein the means for modifying the light is a mask.

Any of the above aspects, further comprising means to remove coherent interference between the one or more parallel lines.

Any of the above aspects, wherein the means to remove coherent interference comprises a waveplate in the path of one or more of the at least three beams.

Aspects of the technology are directed toward an illumination system for a lightsheet microscope for generating a lattice, comprising: a plurality of cylindrical lens; an annulus mask disposed near a first end of the plurality of cylindrical lens and configured to confine light to a clear aperture of an annulus; and a variable optical relay disposed near a first end of the annulus mask.

Any of the above aspects, further comprising: an objective disposed near a first end of the optical mask.

Any of the above aspects, wherein the plurality of cylindrical lens generates two or more parallel lines focused on a pupil plane.

Any of the above aspects, wherein the two or more parallel lines comprises three parallel lines.

Any of the above aspects, wherein the three parallel lines are spaced on the annulus to generate a square lattice or a hex lattice.

Any of the above aspects, wherein the variable optical relay is configured to change a spacing of the two or more parallel lines.

Any of the above aspects, further comprising: a pair of axicons configured to further confine the light to the annulus.

Any of the above aspects, further comprising: a phaseplate configured to shape light into an annulus ring.

Any of the above aspects, wherein the annulus mask is configured to change the annulus thickness and diameter.

Any of the above aspects, wherein a plurality of annuli are configured to be moved into place at a pupil plane, and wherein the plurality of annuli have different thicknesses and diameters.

Any of the above aspects, wherein the variable optical relay is configured to change the diameter of the annulus.

Any of the above aspects, further comprising:
a waveplate, the waveplate disposed in a path of one or more of the two or more parallel lines.

Any of the above aspects, wherein the waveplate removes coherent interference of the two or more parallel lines.

Any of the above aspects, further comprising: a variable waveplate, the variable waveplate disposed in a path of one or more of the two or more parallel lines.

Any of the above aspects, wherein the variable waveplate is a liquid crystal waveplate.

Any of the above aspects, wherein the variable waveplate is a moving shear plate with varying thickness.

Any of the above aspects, wherein the variable waveplate is a set of moving shear plates.

Aspects of the technology are directed toward an illumination system for a lightsheet microscope for generating a lattice, comprising: one or more cylindrical lenses configured to generate one or more parallel lines focused on a pupil plane; and an annulus mask disposed proximate the one or more cylindrical lenses and configured to modify the one or more parallel lines to create at least three beams.

Any of the above aspects, wherein the one or more parallel lines comprises one line, and wherein the one line is divided by the annulus mask to generate a square lattice or a hex lattice.

Any of the above aspects, further comprising: a waveplate positioned in a path of one or more of the at least three beams and configured to remove coherent interference between the one or more parallel lines.

Aspects of the technology are directed toward any one or more of the features disclosed herein;

Aspects of the technology are directed toward any one or more of the features as substantially disclosed herein;

Aspects of the technology are directed toward any one of the aspects/features/embodiments in combination with any one or more of the other aspects/features/embodiments.

Aspects of the technology are directed toward the use of any one or more of the aspects as disclosed herein.

The systems of the present disclosure can cooperate and interface with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like.

Furthermore, the disclosed control methods and graphical user interfaces may be readily implemented in software using object or object-oriented software development environments that provide portable source code that can be used on a variety of computer or workstation platforms. Alternatively, the disclosed control methods may be implemented partially or fully in hardware using standard logic circuits or VLSI design. Whether software or hardware is used to implement the systems in accordance with the present disclosure is dependent on the speed and/or efficiency requirements of the system, the particular function, and the particular software or hardware systems or microprocessor or microcomputer systems being utilized.

In accordance with the present disclosure, a lattice illumination device is provided. While the present disclosure has been described in conjunction with a number of embodiments, many alternatives, modifications and variations would be or are apparent to those of ordinary skill in the applicable arts. Accordingly, the present disclosure is intended to embrace all such alternatives, modifications, equivalents and variations that are within the spirit and scope of the present disclosure.

The invention claimed is:
1. An illumination system for a lightsheet microscope for generating a lattice that comprises:
   means to generate two or more parallel lines focused on a pupil plane;
   means to confine light from the two or more parallel lines to a clear aperture of an annulus; and
   a pair of axicons configured to further confine the light from the clear aperture of the annulus.

2. The system of claim 1, wherein the means for generating the two or more parallel lines is an array of three or more cylindrical lenses.

3. The system of claim 1, wherein the two or more parallel lines comprises three parallel lines.

4. The system of claim 3, wherein the three parallel lines are spaced on the annulus to generate a square lattice or a hex lattice.

5. The system of claim 1, further comprising a variable optical relay configured to change a spacing of the two or more parallel lines.

6. The system of claim 1, wherein the means for confining the light is an annulus mask, and wherein the means for generating the two or more parallel lines comprises an array of three or more cylindrical lenses.

7. The system of claim 1, further comprising a phase-plate configured to shape the light into an annulus ring.

8. The system of claim 1, wherein the means to confine the light to the annulus is configured to change the annulus thickness and diameter.

9. The system of claim 8, wherein a plurality of annuli can be moved into place at the pupil plane, and wherein the plurality of annuli have different thicknesses and diameters.

10. The system of claim 8, wherein a variable optical relay is used to simulate a change in the diameter of the annulus.

11. The system of claim 1, further comprising means to remove coherent interference of the two or more parallel lines.

12. The system of claim 11, wherein the means to remove the coherent interference comprises a waveplate in a path of one or more of the two or more parallel lines.

13. The system of claim 11, wherein the means to remove the coherent interference comprises a variable waveplate in a path of one or more of the two or more parallel lines.

14. The system of claim 13, wherein the variable waveplate is a liquid crystal waveplate.

15. The system of claim 13, wherein the variable waveplate is a moving shear plate with varying thickness.

16. The system of claim 13, wherein the variable waveplate is a set of moving shear plates.

17. The illumination system of claim 1, further comprising:
a variable waveplate, the variable waveplate disposed in a path of one or more of the two or more parallel lines focused on the pupil plane and comprising a moving shear plate with varying thickness.

18. An illumination system for a lightsheet microscope for generating a lattice comprising:
means to generate two or more parallel lines focused on a pupil plane;
means to modify light from the two or more parallel lines to create at least three beams; and
a variable waveplate, the variable waveplate disposed in a path of one or more of the two or more parallel lines focused on the pupil plane and comprising a set of moving shear plates.

19. The system of claim 18, wherein the means for generating the two or more parallel lines is three or more cylindrical lenses.

20. The system of claim 18, wherein the two or more parallel lines comprises a beam.

21. The system of claim 20, wherein the beam is divided by a mask to generate a square lattice or a hex lattice.

22. The system of claim 18, wherein the means for modifying the light is a mask.

23. The system of claim 18, further comprising means to remove coherent interference between the two or more parallel lines.

24. The system of claim 23, wherein the means to remove coherent interference comprises a second waveplate in a path of one or more of the at least three beams.

25. The illumination system of claim 18, further comprising:
a pair of axicons configured to further confine the light from a clear aperture of an annulus.

26. An illumination system for a lightsheet microscope for generating a lattice, comprising:
a plurality of cylindrical lenses;
an annulus mask disposed near a first end of the plurality of cylindrical lenses and configured to confine light to a clear aperture of an annulus;
a variable optical relay disposed near a first end of the annulus mask; and
a variable waveplate, the variable waveplate disposed in a path of one or more of two or more parallel lines focused on a pupil plane and comprising a moving shear plate with varying thickness.

27. The illumination system of claim 26, further comprising:
an objective disposed near a first end of the annulus mask.

28. The illumination system of claim 26, wherein the plurality of cylindrical lenses generates the two or more parallel lines.

29. The illumination system of claim 28, wherein the two or more parallel lines comprises three parallel lines.

30. The illumination system of claim 29, wherein the three parallel lines are spaced on the annulus to generate a square lattice or a hex lattice.

31. The illumination system of claim 28, wherein the variable optical relay is configured to change a spacing of the two or more parallel lines.

32. The illumination system of claim 28, further comprising:
a waveplate, the waveplate disposed in a path of one or more of the two or more parallel lines.

33. The illumination system of claim 32, wherein the waveplate removes coherent interference of the two or more parallel lines.

34. The illumination system of claim 26, further comprising:
a phase-plate configured to shape light into an annulus ring.

35. The illumination system of claim 26, wherein the annulus mask is configured to change the annulus thickness and diameter.

36. The illumination system of claim 35, wherein a plurality of annuli are configured to be moved into place at the pupil plane, and wherein the plurality of annuli have different thicknesses and diameters.

37. The illumination system of claim 26, wherein the variable optical relay is configured to simulate a change in the diameter of the annulus.

38. The illumination system of claim 26, wherein the variable waveplate comprises a liquid crystal waveplate.

39. The illumination system of claim 26, wherein the variable waveplate further comprises a set of moving shear plates.

40. An illumination system for a lightsheet microscope for generating a lattice, comprising:
two or more cylindrical lenses configured to generate two or more parallel lines focused on a pupil plane;
an annulus mask disposed proximate the two or more cylindrical lenses and configured to modify the two or more parallel lines to create at least three beams; and
a pair of axicons configured to further confine the at least three beams from an annulus.

41. The illumination system of claim 40, wherein the two or more parallel lines comprises a beam, and wherein the beam is divided by the annulus mask to generate a square lattice or a hex lattice.

42. The illumination system of claim 40, further comprising:
a waveplate positioned in a path of one or more of the at least three beams and configured to remove coherent interference between the two or more parallel lines.

43. The illumination system of claim 42, wherein the waveplate comprises a shear plate.

* * * * *